United States Patent
Book et al.

(10) Patent No.: US 8,700,934 B2
(45) Date of Patent: Apr. 15, 2014

(54) SYSTEM AND METHOD FOR DYNAMICALLY CONFIGURING PROCESSING SPEEDS IN A WIRELESS MOBILE TELECOMMUNICATIONS DEVICE

(75) Inventors: Christopher Simon Book, Waterloo (CA); Mingxian Mao, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 625 days.

(21) Appl. No.: 12/844,627

(22) Filed: Jul. 27, 2010

(65) Prior Publication Data

US 2012/0030454 A1    Feb. 2, 2012

(51) Int. Cl.
  *G06F 1/00*    (2006.01)
  *G06F 13/14*   (2006.01)

(52) U.S. Cl.
  USPC ............................. 713/322; 713/340; 710/305

(58) Field of Classification Search
  USPC ........... 713/300, 322, 324, 340; 710/305, 313
  See application file for complete search history.

(56) References Cited

U.S. PATENT DOCUMENTS

| | | | | |
|---|---|---|---|---|
| 5,142,684 | A * | 8/1992 | Perry et al. | 713/320 |
| 5,230,056 | A * | 7/1993 | Hoshina | 713/340 |
| 5,311,441 | A * | 5/1994 | Tayama et al. | 702/63 |
| 5,587,924 | A * | 12/1996 | Rossi | 702/63 |
| 6,114,831 | A * | 9/2000 | Attimont et al. | 320/106 |
| 6,828,848 | B2 * | 12/2004 | Lee | 327/534 |
| 6,946,817 | B2 * | 9/2005 | Fischer et al. | 320/132 |
| 6,963,986 | B1 * | 11/2005 | Briggs et al. | 713/320 |
| 7,017,061 | B2 * | 3/2006 | Lippert et al. | 713/324 |
| 7,028,211 | B2 * | 4/2006 | Mantani | 713/600 |
| 7,096,373 | B2 * | 8/2006 | Oh | 713/320 |
| 7,219,246 | B2 * | 5/2007 | Julicher et al. | 713/322 |
| 7,340,627 | B1 * | 3/2008 | Harvey | 713/330 |
| 2004/0057324 | A1 * | 3/2004 | Abe et al. | 365/232 |
| 2006/0242433 | A1 * | 10/2006 | Fu et al. | 713/300 |
| 2007/0123303 | A1 * | 5/2007 | Book et al. | 455/557 |
| 2008/0168289 | A1 * | 7/2008 | Noh | 713/323 |
| 2009/0132837 | A1 * | 5/2009 | Kumar | 713/320 |
| 2009/0144572 | A1 * | 6/2009 | Rozen et al. | 713/322 |
| 2009/0200982 | A1 * | 8/2009 | Hurtz | 320/103 |
| 2010/0202161 | A1 * | 8/2010 | Sims et al. | 363/20 |
| 2010/0281183 | A1 * | 11/2010 | Van Bebber | 710/5 |
| 2011/0179201 | A1 * | 7/2011 | Monks et al. | 710/60 |
| 2011/0260755 | A1 * | 10/2011 | Littow | 327/58 |

OTHER PUBLICATIONS

Beyond Logic, USB Vbus Power, <http://www.beyondlogic.org/usbnutshell/usb2.shtml#PowerVbus>, accessed Jul. 10, 2013.*

(Continued)

*Primary Examiner* — Khanh Dang
(74) *Attorney, Agent, or Firm* — Jenna L. Wilson; Dimock Stratton LLP

(57) ABSTRACT

There is disclosed a system and method executable in a wireless mobile communication device for dynamically configuring processing speed for a main processor in the device during device initialization. In an embodiment, the method comprises: initiating a boot-rom procedure; determining whether a battery is present in the device, and in response to the presence of the battery, determining whether the battery charge level is above a predetermined threshold; determining whether a USB connection to the device is present, and in response to the presence of a USB connection, enumerating the USB connection; and wherein, in response to the presence of the battery and the battery charge level being above a predetermined threshold, or in response to the USB connection being enumerated at a higher current, the processing speed of the main processor is increased.

23 Claims, 4 Drawing Sheets

(56) References Cited

OTHER PUBLICATIONS

Huang, M., "SetCPU", May 31, 2009, http://web.archive.org/web/20090531081808/http://www.pokedev.com/setcpu/, accessed Jun. 2, 2011.

Garron, G., "cpufreqd—How to configure you cpu speed", Apr. 13, 2008, http://www.go2linux.org/how-to-configure-cpufreqd, accessed Jun. 2, 2011.

Other World Computing, Inc, "CPU Director (CPUD)", http://www.powerlogix.com/products/cpudirector/index.html, accessed Jun. 2, 2011.

* cited by examiner

SYSTEM AND METHOD FOR DYNAMICALLY CONFIGURING PROCESSING SPEEDS IN A WIRELESS MOBILE TELECOMMUNICATIONS DEVICE

The present disclosure relates generally to wireless mobile telecommunications devices, and more particularly to device initialization procedures.

For many wireless mobile telecommunications devices, boot-rom processing must be completed during a device initialization procedure before the device can perform certain functions. In order to bring the device to a functional state as quickly as possible, it is desirable to complete the device initialization procedure quickly.

DETAILED DESCRIPTION

As noted above, the present disclosure relates generally to wireless handheld telecommunications devices, and more particularly to device initialization procedures.

Typically, boot-time processing must be performed during a device initialization procedure before certain functions in the device become available for use. If the initialization procedure takes too long, the device may not be fully functional for an extended period of time, and this may negatively affect user satisfaction with the performance of the device. In order to address this problem, an improved system and method is proposed for dynamically configuring the boot-rom processing speeds in a wireless handheld communications device, in order to effectively shorten the initialization procedure.

Figure 1:
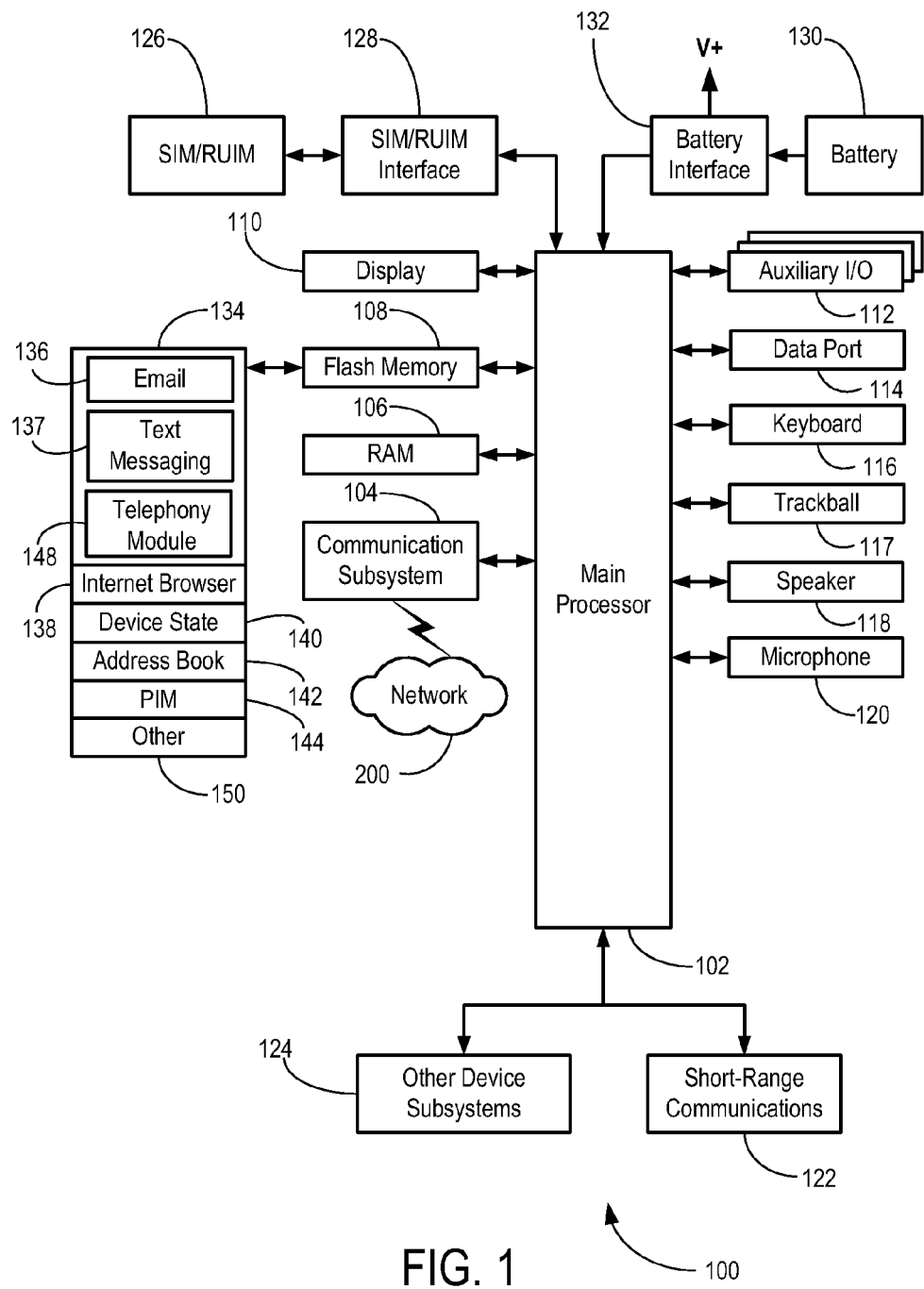
FIG. 1 is a schematic block diagram of various components of a handheld communication device.

In an illustrative embodiment, the principles of the present disclosure may be practiced with a mobile communication device in a wireless operating environment. Shown in FIG. 1 is a schematic block diagram of an illustrative mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and sends messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122 and other device subsystems 124. In some embodiments, the keyboard 116 may comprise a virtual keyboard or a physical keyboard or both. In some embodiments, the display 110 may comprise a touchscreen display.

In an embodiment, the auxiliary I/O subsystem 112 may be an industry standard bus connection such as Universal Serial Bus (USB), as described in the published specification for USB 1.1, USB 2.0, and USB 3.0 (see USB website, currently at www.usb.org). These USB specifications define a data connection standard, as well as an electrical connection standard for powering an attached device. For example, USB 2.0 defines that an attached USB client device must not initially draw a current of more than 100 mA before the USB client device is enumerated. After the USB client device is enumerated, USB 2.0 defines a maximum current draw of 500 mA for powering the USB client device, or for charging a rechargeable battery provided in the USB client device. The USB specification will be referenced in more detail below, in further describing the disclosed system and method for dynamically configuring boot-rom processing speeds.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. In some embodiments, the communication device 100 may be solar powered or otherwise powered with or without use of a battery.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

Software applications 134 may include an email module 136. Email module 136 can be any suitable email software program that allows a subscriber or user of the communication device 100 to send and receive email communications. Various alternatives exist for the messaging application 136 as is well known to those skilled in the art. Messages that have been sent or received by the user are typically stored in local storage such as flash memory 108 of the communication device 100, or in some other suitable storage element in the communication device 100. In an alternative embodiment, some of the sent and received messages may be stored remotely from the device 100 such as in a data store of an associated host system that the communication device 100 communicates with.

Software applications 134 may also include a text messaging module 137 for sending and receiving Short Message Service (SMS) text messages on device 100. Furthermore, software applications 134 may include a telephony module 148 for supporting various telephony functions on device 100.

Still referring to FIG. 1, telephony module 148 may be operatively integrated with communication subsystem 104, keyboard 116, trackball 117, speaker 118, and microphone 120. Telephony module 148 may also be integrated with address book 142, e-mail module 136, text messaging module 137, Internet browser 138, RAM 106, flash memory 108 and display 110 to perform various other telephony functions on device 100.

The device 100 may further include a device state module 140, a Personal Information Manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystem 124.

To identify a user, the communications device 100 may use a SIM/RUIM/USIM card 126 (i.e. Subscriber Identity Module or a Removable User Identity Module or a Universal Subscriber Identity Module, etc.), which is inserted into a SIM/RUIM/USIM interface 128, to communicate with a network. The SIM/RUIM/USIM card 126 is one type of a conventional "smart card" that can be used to identify a user of the communications device 100 and to personalize the communications device 100, among other things. Without the SIM/RUIM/USIM card 126, the communications device 100 may not be fully operational for communication with the wireless network 200, in some embodiments. By inserting the SIM/RUIM/USIM card 126 into the SIM/RUIM/USIM interface 128, a user can access subscribed services. Such subscribed services may include, for example, web browsing and messaging such as email, voice mail, SMS, and Multimedia Messaging Services (MMS).

Figure 2:
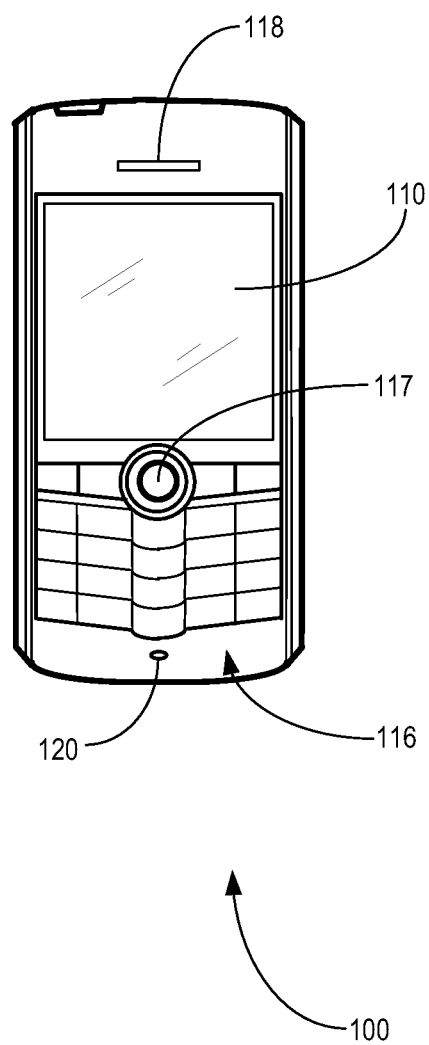
FIG. 2 is an illustrative front view of a handheld communication device including the various components as shown in FIG. 1.

Now referring to FIG. 2, shown is an illustrative front view of a handheld mobile communication device 100 that may provide a suitable operating environment. As shown, the communication device 100 may include a display 110, a keyboard 116, and other input or navigation means such as a trackball 117. The display 110 may be configured to display various screens allowing the user of device 100 to view screen outputs from the various software applications 134. Display 110 may also be configured to provide a touch-sensitive screen input in response to a prompt or query displayed on display 110. Device 100 further includes an earpiece or speaker 118 and a microphone 120 in order to support the telephony functions previously described.

Figure 3:
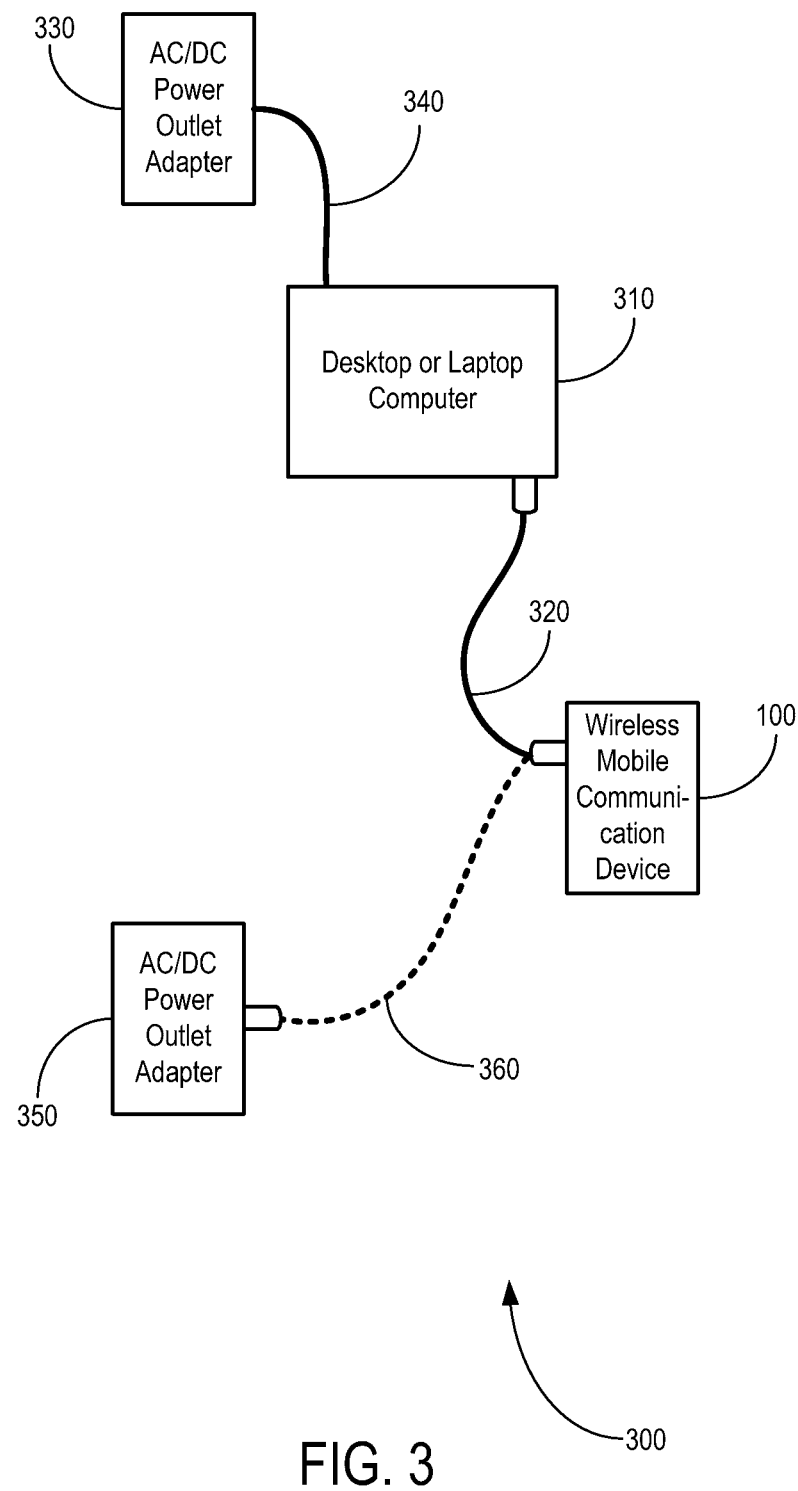
FIG. 3 is a schematic block diagram of an operating environment for the device of FIG. 1 and FIG. 2.

Now referring to FIG. 3, shown is a schematic block diagram of an operating environment 300 for initializing the wireless mobile communication device 100 of FIG. 1 and FIG. 2. As shown, operating environment 300 may include a desktop or laptop computer 310, to which device 100 may be attached via a suitable cable 320. For example, cable 320 may be a suitable USB 2.0 specification cable which may be used to connect a USB port on USB client device 100 to the USB port of USB host computer 310.

As shown in FIG. 3, USB host computer 310 may be connected to a power outlet via a power outlet adapter 330 and a power cord 340. For example, the power outlet adapter 330 may be configured to connect either to an AC power source (e.g. AC outlet provided in a home or office at a mains voltage of approximately 100-127V or 220-240V and at 50/60 Hz), or to a DC power source (automobile power outlet at approximately 12V). In this case, USB client device 100 is not connected directly to the power source, but rather draws power from USB host computer 310 to power its operations and/or to charge a rechargeable battery stored in USB client device 100. In addition, USB client device 100 is configured to communicate with USB host computer 310 by transmitting or receiving data, in order for device enumeration to take place.

Alternatively, device 100 may be connected directly to a power source via power outlet adapter 350 and a suitable power cord 360. For example, power cord 360 may be a suitable USB 2.0 specification cable for connecting device 100 to an AC or DC power source. However, in this case, there is no data communication between device 100 and the AC/DC power outlet. Nevertheless, device 100 is still capable of determining what type of USB connection it has, and is able to recognize that it is connected directly to an AC or DC power source rather than to a USB host computer 310.

In alternative embodiments, with a suitable adapter or converter, various other power sources may be available to connect to device 100, such as a portable solar cell power generator, or a separately housed battery source providing mobile recharging capabilities for the device 100 via a standard USB 2.0 connection.

As noted earlier, USB 2.0 defines an initial maximum current draw of 100 mA for a newly connected USB client device before the device is enumerated. However, upon device 100 being enumerated, USB 2.0 may define current draw of up to 500 mA depending upon the connected power source. Thus, in this illustrative operating environment 300 shown in FIG. 3, regardless of which power source device 100 is initially connected to, the initial current draw available to device 100 via the USB connection is limited to 100 mA.

As recognized by the inventors, this initial current draw of 100 mA via a USB connection can be a significant limiting factor in setting the processing speed of main processor 102 of device 100. This in turn affects the boot-rom processing speed of device 100 during the device initialization procedure. Thus, it is desirable to make available the increased current draw of 500 mA sooner.

As will be appreciated, an increased current draw of 500 mA would allow main processor 102 to be set to run at higher processing speeds, thus permitting the boot-rom processing speed to increase, and allowing the initialization procedure for the device to be completed more quickly.

In an embodiment, the determination of whether the boot-rom processing speed can be increased is dependent upon the presence of a rechargeable battery 130 within the device 100, and the present level of charge of battery 130. For example, if the rechargeable battery 130 is present and has a charge level above a certain predetermined threshold, device 100 may have all the power it needs to increase the speed of main processor 102, even as the device 100 is connected via a USB cable to a power source and is initially limited to draw only 100 mA.

However, if the present level of charge in battery 130 is lower than the predetermined threshold, or if battery 130 has been removed and is not present at all, it may not be possible to increase the processing speed of main processor 102 while the device 100 is limited to draw only 100 mA from the USB connection. In this case, device 100 must wait until the USB enumeration process has taken place, and device 100 is enumerated to draw an increased current of 500 mA from the USB connection.

In an embodiment, main processor 102 of device 100 may be configured with more than one processing core, and if so, it may be possible to further increase boot-rom processing speed by turning on more than one processing core for the boot-rom procedure. However, as the increase in number of cores will require an increase in power, additional current may be required to run more than one core. Thus, a combination of increased power, increased processor speed, and an increase in the number of cores engaged to perform the boot-rom procedure may all reduce the amount of time it takes for various functions on device 100 to be available.

Upon completion of the boot-rom procedure, device 100 may then load an operating system (OS) into RAM 106 to fully enable device functions. Thus, it is desirable to reach the point of a fully loaded OS as soon as possible, and a shortened boot-rom processing time will help in this regard.

In summary, the processor speed of main processor 102 during boot-rom is configured based on the present charge level of battery 130 and the available USB current input limit, either 100 mA or 500 mA, based on the present enumeration status of device 100. If the battery 130 is present and the battery charge level is above a predetermined threshold, or if USB 500 mA is enumerated, then the processor speed of main processor 102 and the number of cores (if applicable) can be increased. Otherwise, if the USB connection is limited to 100 mA and the present charge level of battery 130 is not sufficient, the processor speed of main processor 102 may be reduced, or kept low, and only a single processor would be used.

In an embodiment, before the boot-rom is finished, the USB connection may detach and go back to un-enumerated state, even if the USB cable is still physically attached to the device 100. In this case, the processor speed or number of cores is once again reconfigured based on the USB state and present battery charge level, and if the battery charge is sufficiently high the processing speed may continue at a high level regardless of the USB connection. Otherwise, the boot-rom processing speed may have to be temporarily decreased before it is increased after the device 100 is enumerated once again during loading of the OS.

In another embodiment, if device 100 has determined that it is connected directly to an AC or DC power outlet rather than a USB host computer 310, the processor speed and number of cores could be set to remain high during the boot-rom and OS loading procedures, as the AC or DC power outlet will be able to supply the 500 mA of current required to run the processor at a higher speed.

Figure 4:
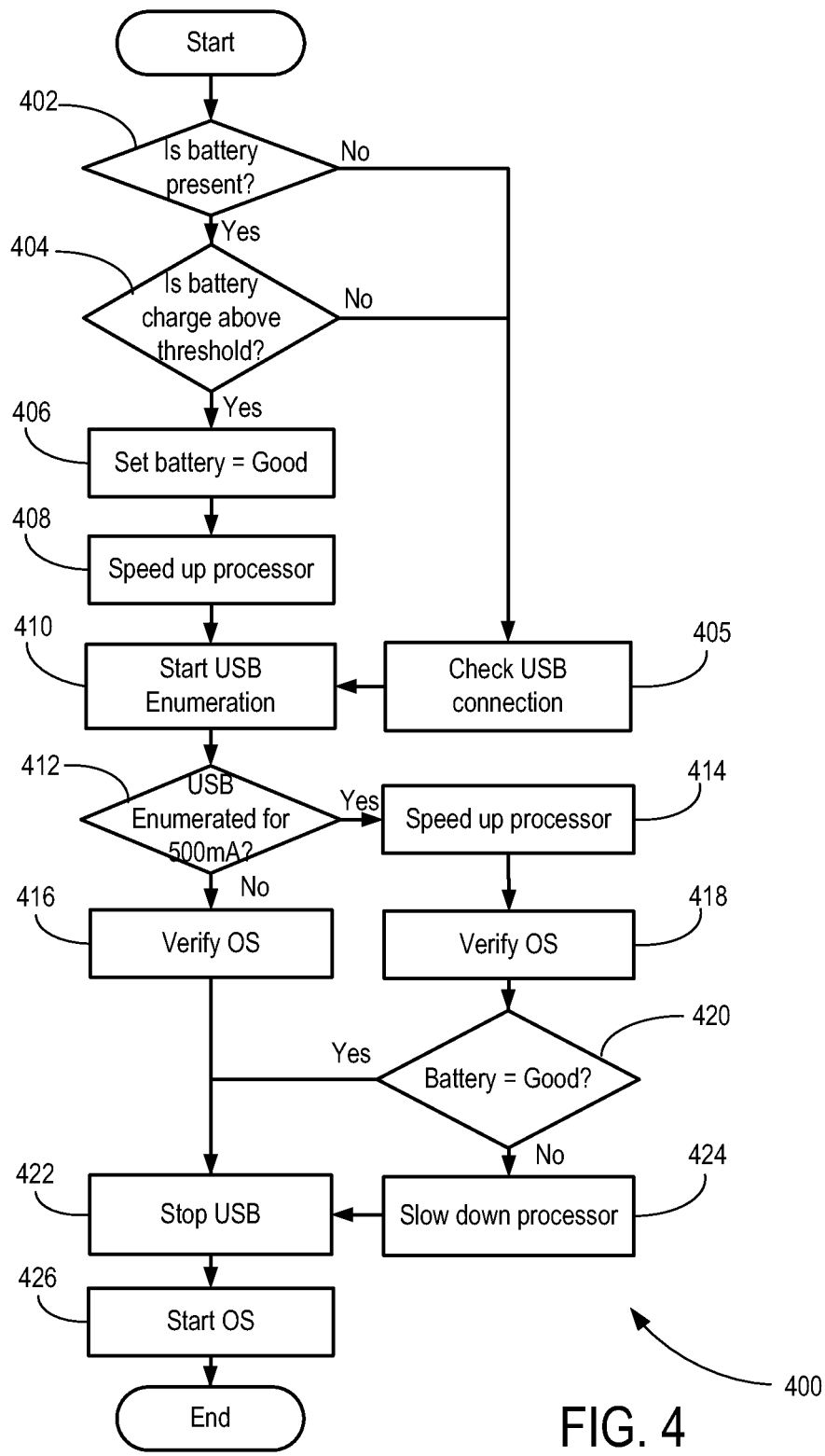
FIG. 4 is a schematic flow chart of a method in accordance with an embodiment.

Now referring to FIG. 4, shown is a method 400 for performing a boot-rom procedure in a device 100 in accordance with an embodiment. As shown, method 400 begins and at decision block 402, determines if a battery is present in device 100. If no, method 400 proceeds directly to block 405. If yes, method 400 proceeds to decision block 404.

At decision block 404, method 400 determines if the battery charge is above a predetermined threshold. If no, method 400 proceeds directly to block 405. If yes, method 400 proceeds to block 406, where method 400 sets the battery status flag to be "Good".

At block 405, method 400 checks that device 100 currently has a USB connection and proceeds to block 410 described further below.

From block 406, method 400 then proceeds to block 408, where method 400 speeds up the processor speed, so that the boot-rom procedure can be completed more quickly. Thus, if the battery power is sufficiently high, processing speed is set to high even before starting the USB enumeration process for device 100. Method 400 then proceeds to block 410, where method 400 starts the enumeration process.

From block 410, method 400 proceeds to decision block 412, where method 400 determines if the device 100 has been USB enumerated for 500 mA. If yes, method 400 proceeds to block 414, where method 400 speeds up the processor speed. If no, method 400 proceeds to block 416, where method 400 verifies the OS to ensure that the OS is not corrupted and is properly signed. Typically, this OS verification process is what may take up a significant amount of time during the boot-rom procedure, and thus it is desirable to run the processor at a high speed during the OS verification process.

From block 414, method 400 proceeds to block 418, where method 400 verifies the OS with the main processor 102 running at high speed. Method 400 then proceeds to decision block 420, where method 400 checks whether the battery status flag set earlier at block 406 is set to "Good". If yes, method 400 proceeds to block 422, where method 400 stops the USB connection and leaves the boot-rom procedure.

If no, method 400 proceeds to block 424, where method 400 slows down the main processor 102 if the processor is running at high speed. Method 400 then proceeds to block 422 to stop the USB procedure.

At block 426, method 400 re-enumerates the USB connection and starts the OS. Method 400 then ends.

As will be appreciated, during the boot-rom procedure, the above described method allows the main processor 102 to run at a fast speed when the battery status condition is good, even when connected to a USB connection in which the initial current draw is limited. In other words, even if a USB connection only allows a maximum current draw of 100 mA at any particular time, with a good battery, the main processor 102 can be set to draw 100 mA from the USB connection and draw additional power from the good battery in order to run the main processor 102 at high speed during the boot-rom process. However, if the battery status is not good, the maximum current draw is dictated by the USB connection and USB enumeration which will determine the speed at which main processor 102 can run at any time.

By dynamically configuring the processor speed of device 100 during the boot-rom procedure based on battery charge levels and within USB power limits, the boot-rom procedure may be completed sooner than simply allowing it to occur without any dynamic configuration of the processing speed.

Thus, in one aspect, there is provided a method executable in a wireless mobile communication device for dynamically configuring processing speed for a main processor in the device during device initialization, comprising: initiating a boot-rom procedure; determining whether a battery is present in the device, and in response to the presence of the battery, determining whether the battery charge level is above a predetermined threshold; determining whether a USB connection to the device is present, and in response to the presence of a USB connection, enumerating the USB connection; and wherein, in response to the presence of the battery and the battery charge level being above a predetermined threshold, or in response to the USB connection being enumerated at a higher current, the processing speed of the main processor is increased.

In an embodiment, the method further comprises: determining whether the USB connection to the device is a connection to a USB host computer or a direct connection to an AC or DC power outlet; and wherein in response to a determination that the USB connection to the device is a direct connection to an AC or DC power outlet, the processor speed is increased.

In another embodiment, the main processor of the device includes a plurality of processing cores, and wherein the method further comprises: in response to the presence of the battery and the battery charge level being above a predetermined threshold, or in response to the USB connection being enumerated at a higher current, the number of processing cores is increased.

In another embodiment, the method further comprises: in response to the absence of a battery or if the battery charge level is below a predetermined threshold, and the USB connection not being enumerated at a higher current, the processing speed of the main processor is decreased.

In another embodiment, the USB connection is defined by one of the USB 1.1, USB 2.0 or USB 3.0 specification.

In another embodiment, the processor speed is initially set such that the device draws no more than 100 mA of current from the USB connection; and wherein the processor speed is increased such that the device draws no more than 500 mA of current from the USB connection.

In another embodiment, the method further comprises: after completion of the boot-rom procedure, starting the operating system with the increased processing speed of the main processor.

In another aspect, there is provided a system for dynamically configuring processing speed for a main processor in the device during device initialization, comprising: means for initiating a boot-rom procedure; means for determining whether a battery is present in the device, and in response to the presence of the battery, determining whether the battery charge level is above a predetermined threshold; means for determining whether a USB connection to the device is present, and in response to the presence of a USB connection, enumerating the USB connection; and means for increasing the processing speed of the main processor in response to the presence of the battery and the battery charge level being above a predetermined threshold, or in response to the USB connection being enumerated at a higher current.

In an embodiment, the method further comprises: means for determining whether the USB connection to the device is a connection to a USB host computer or a direct connection to an AC or DC power outlet; and means for increasing the processor speed in response to a determination that the USB connection to the device is a direct connection to an AC or DC power outlet.

In another embodiment, the main processor of the device includes a plurality of processing cores, and wherein the system further comprises: means for increasing the number of processing cores in response to the presence of the battery and the battery charge level being above a predetermined threshold, or in response to the USB connection being enumerated at a higher current.

In another embodiment, the system further comprises: means for decreasing the processing speed of the main processor in response to the absence of a battery or if the battery charge level is below a predetermined threshold, and the USB connection not being enumerated at a higher current.

In another embodiment, the USB connection is defined by one of the USB 1.1, USB 2.0 or USB 3.0 specification.

In another embodiment, the processor speed is initially set such that the device draws no more than 100 mA of current from the USB connection; and wherein the processor speed is increased such that the device draws no more than 500 mA of current from the USB connection.

In another embodiment, the system further comprises: means for starting the operating system with the increased processing speed of the main processor after completion of the boot-rom procedure.

In another aspect, there is provided a computer readable media storing computer readable code that when loaded into a wireless mobile communication device adapts the device to dynamically configure processing speed for a main processor in the device during device initialization, the computer readable medium comprising: code for initiating a boot-rom procedure; code for determining whether a battery is present in the device, and in response to the presence of the battery, determining whether the battery charge level is above a predetermined threshold; code for determining whether a USB connection to the device is present, and in response to the presence of a USB connection, enumerating the USB connection; and code for increasing the processing speed of the main processor in response to the presence of the battery and the battery charge level being above a predetermined threshold, or in response to the USB connection being enumerated at a higher current.

In an embodiment, the computer readable media further comprises: code for determining whether the USB connection to the device is a connection to a USB host computer or a direct connection to an AC or DC power outlet; and code for increasing the processing speed in response to a determination that the USB connection to the device is a direct connection to an AC or DC power outlet.

In another embodiment, the main processor of the device includes a plurality of processing cores, and the computer readable media further comprises: code for increasing the number of processing cores in response to the presence of the battery and the battery charge level being above a predetermined threshold, or in response to the USB connection being enumerated a higher current.

In another embodiment, the computer readable media further comprises: code for decreasing the processing speed of the main processor in response to the absence of a battery or if the battery charge level is below a predetermined threshold, and the USB connection not being enumerated at a higher current.

In another embodiment, the USB connection is defined by one of the USB 1.1, USB 2.0 or USB 3.0 specification.

In another embodiment, the processor speed is initially set such that the device draws no more than 100 mA of current from the USB connection; and wherein the processor speed is increased such that the device draws no more than 500 mA of current from the USB connection.

While illustrative embodiments have been described above, it will be appreciated that various changes and modifications may be made. More generally, the scope of the invention is defined by the following claims.

What is claimed is:

1. A method, comprising:
   initiating a boot-ROM procedure on a mobile device, the boot-ROM procedure being executed by a processor of the mobile device;
   determining whether a battery is present in the mobile device, and when the battery is present, determining whether a charge level of the battery is above a predetermined charge threshold;
   determining whether a USB connection to the mobile device is present;
   when the USB connection is present, determining a current draw from the USB connection, wherein prior to enumerating the USB connection, a level of current draw available to the mobile device from the USB connection is a lower current threshold, and after enumerating the USB connection, the level of current draw available to the mobile device from the USB connection is an upper current threshold greater than the lower current threshold;
   when the battery is present and the battery charge level is above the predetermined charge threshold, and when the USB connection is present and a current draw from the USB connection is at the lower current threshold, increasing the processing speed of the processor during the boot-ROM procedure, wherein current for increasing the processing speed is drawn from both the USB connection at no more than the lower current threshold and the battery, a total current draw from both the USB connection and the battery exceeding the lower current threshold.

2. The method of claim 1, further comprising:
after increasing the processing speed, enumerating the USB connection during the boot-ROM procedure.

3. The method of claim 1, wherein the processor of the device includes a plurality of processing cores, and increasing the processing speed of the processor comprises increasing a number of processing cores used to execute the boot-ROM procedure.

4. The method of claim 1, further comprising, after increasing the processing speed of the processor:
when the battery charge level is determined to be below the predetermined charge threshold, and the current draw from the USB connection is less than the upper current threshold, decreasing the processing speed of the processor during the boot-ROM procedure.

5. The method of claim 1, wherein the USB connection is defined by one of the USB 1.1, USB 2.0 or USB 3.0 specification.

6. The method of claim 1, wherein the processing speed is initially set such that the mobile device draws no more than the lower current threshold from the USB connection.

7. The method of claim 1, further comprising:
after completion of the boot-ROM procedure, starting the operating system with the increased processing speed.

8. The method of claim 4, further comprising, after decreasing the processing speed:
enumerating the USB connection during the boot-ROM procedure; and
increasing the processing speed upon determining that a current draw at the upper current threshold is available from the enumerated USB connection.

9. The method of claim 1, wherein the lower current threshold is about 100 mA.

10. The method of claim 1, wherein a combined current draw from the battery and the USB connection is about 500 mA.

11. The method of claim 1, wherein the upper current threshold is about 500 mA.

12. A mobile device, comprising:
a processor configured to:
initiate a boot-ROM procedure executed by the processor;
determine whether a battery is present in the mobile device, and when the battery is present, determine whether a charge level of the battery is above a predetermined charge threshold;
determine whether a USB connection to the mobile device is present;
when the USB connection is present, determine a current draw from the USB connection, wherein prior to enumerating the USB connection, a level of current draw available to the mobile device from the USB connection is a lower current threshold, and after enumerating the USB connection, the level of current draw available to the mobile device from the USB connection is an upper current threshold greater than the lower current threshold;
when the battery is present and the battery charge level is above the predetermined charge threshold, and when the USB connection is present and a current draw from the USB connection is at the lower current threshold, increase the processing speed of the processor during the boot-ROM procedure, wherein current for increasing the processing speed is drawn from both the USB connection at no more than the lower current threshold and the battery, a total current draw from both the USB connection and the battery exceeding the lower current threshold.

13. The mobile device of claim 12, wherein the processor is further configured to:
after increasing the processing speed, enumerate the USB connection during the boot-ROM procedure.

14. The mobile device of claim 12, wherein the processor of the mobile device includes a plurality of processing cores, and wherein the processor is further configured to:
increase the processing speed by increasing the number of processing cores used to execute the boot-ROM procedure.

15. The mobile device of claim 12 wherein the processor is further configured to:
decrease the processing speed of the processor when the battery charge level is determined to be below the predetermined charge threshold, and the current draw from the USB connection is less than the upper current threshold.

16. The mobile device of claim 15, wherein the processor is further configured to:
enumerate the USB connection during the boot-ROM procedure; and
increase the processing speed upon determining that a current draw at the upper current threshold is available from the enumerated USB connection.

17. The mobile device of claim 12, wherein the USB connection is defined by one of the USB 1.1, USB 2.0 or USB 3.0 specification.

18. The mobile device of claim 12, wherein the processing speed is initially set such that the mobile device draws no more than the lower current threshold.

19. The mobile device of claim 12, wherein the processor is further configured to:
start the operating system with the increased processing speed after completion of the boot-ROM procedure.

20. The mobile device of claim 12, wherein the lower current threshold is about 100 mA.

21. The mobile device of claim 12, wherein a combined current draw from the battery and the USB connection is about 500 mA.

22. The mobile device of claim 12, wherein the upper current threshold is about 500 mA.

23. A non-transitory data processor readable medium storing code that when executed by a mobile device, causes the mobile device to implement a method comprising:
initiating a boot-ROM procedure, the boot-ROM procedure being executed by a processor of the mobile device;
determining whether a battery is present in the mobile device, and when the battery is present, determining whether a charge level of the battery is above a predetermined charge threshold;
determining whether a USB connection to the device is present;
when the USB connection is present, determine a current draw from the USB connection, wherein prior to enumerating the USB connection, a level of current draw available to the mobile device from the USB connection is a lower current threshold, and after enumerating the USB connection, the level of current draw available to the mobile device from the USB connection is an upper current threshold greater than the lower current threshold;

when the battery is present and the battery charge level is above the predetermined charge threshold, and when the USB connection is present and a current draw from the USB connection is at the lower current threshold, increase the processing speed of the processor during the boot-ROM procedure, wherein current for increasing the processing speed is drawn from both the USB connection at no more than the lower current threshold and the battery, a total current draw from both the USB connection and the battery exceeding the lower current threshold.

* * * * *